United States Patent
Ming et al.

(10) Patent No.: US 10,949,462 B2
(45) Date of Patent: Mar. 16, 2021

(54) AUDIO IDENTIFICATION METHOD AND APPARATUS, AND COMPUTER STORAGE MEDIUM

(71) Applicant: Tencent Technology (Shenzhen) Company Limited, Guangdong (CN)

(72) Inventors: Jin Xing Ming, Guangdong (CN); Yu Jia Jun, Guangdong (CN); Li Ke, Guangdong (CN); Wu Yong Jian, Guangdong (CN); Huang Fei Yue, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 378 days.

(21) Appl. No.: 15/990,089

(22) Filed: May 25, 2018

(65) Prior Publication Data

US 2018/0276297 A1    Sep. 27, 2018

Related U.S. Application Data

(63) Continuation of application No. PCT/CN2017/077829, filed on Mar. 23, 2017.

(30) Foreign Application Priority Data

Mar. 24, 2016 (CN) .......................... 201610171165.4

(51) Int. Cl.
  *G06F 16/683* (2019.01)
  *G06F 16/638* (2019.01)
  (Continued)

(52) U.S. Cl.
  CPC ............ *G06F 16/683* (2019.01); *G06F 16/00* (2019.01); *G06F 16/638* (2019.01); *G10H 1/00* (2013.01);
  (Continued)

(58) Field of Classification Search
  CPC ..... G06F 16/40; G06F 16/683; G10H 1/0008; G10H 2210/066; G10H 2240/141
  See application file for complete search history.

(56) References Cited

U.S. PATENT DOCUMENTS 6,437,227 B1 * 8/2002 Theimer .............. G10H 1/0041
                                                    84/603
2002/0163533 A1 * 11/2002 Trovato ............. H04N 21/4307
                                                    715/728
(Continued)

FOREIGN PATENT DOCUMENTS

CN         1703734 A       11/2005
CN        101102240 A      1/2008
(Continued)

OTHER PUBLICATIONS

Zhou, Xiang, "Investigation of Searching system of Music Humming based on E2LSH", University of Electronic Science and Technology of China, Sep. 17, 2014, pp. 3, 12, 36 & 37.
(Continued)

*Primary Examiner* — Irete F Ehichioya
*Assistant Examiner* — Ken Hoang
(74) *Attorney, Agent, or Firm* — Brinks Gilson & Lione

(57) ABSTRACT

An audio identification method and apparatus are disclosed within the technical field of audio processing technology. The audio identification solution includes obtaining an original pitch sequence of a to-be-identified audio, where the original pitch sequence is used to indicate a frequency of the to-be-identified audio at each time point. The audio identification solution further includes dividing the original pitch sequence into a plurality of pitch sub-sequences, respectively identifying the original pitch sequence and the plurality of pitch sub-sequences, and combining the identification results. In doing so, the audio identification solution obtains a final identification result by dividing a long pitch
(Continued)

200

201 — Obtain an original pitch sequence of a to-be-identified audio, the original pitch sequence being used to indicate a frequency of the to-be-identified audio at each time point 202 — Divide the original pitch sequence into a plurality of pitch sub-sequences 203 — Respectively identify the original pitch sequence and the plurality of pitch sub-sequences 204 — Combine identification results obtained by respectively identifying the original pitch sequence and the plurality of pitch sub-sequences, to obtain an identification result of the to-be-identified audio sequence into a plurality of short pitch sequences, thus respectively identifying the long pitch sequence and the plurality of short pitch sequences, and combining identification results.

20 Claims, 6 Drawing Sheets

(51) Int. Cl.
*G06F 16/00* (2019.01)
*G10H 1/00* (2006.01)
(52) U.S. Cl.
CPC ..... *G10H 1/0008* (2013.01); *G10H 2210/066* (2013.01); *G10H 2220/096* (2013.01); *G10H 2240/141* (2013.01)

(56) References Cited

U.S. PATENT DOCUMENTS

2007/0162497 A1\* 7/2007 Pauws .................. G06F 16/683

2007/0163425 A1\* 7/2007 Tsui ..................... G10H 1/0008
84/609

FOREIGN PATENT DOCUMENTS

| CN | 101364238 A | 2/2009 |
| CN | 101504834 A | 8/2009 |
| CN | 102521281 A | 6/2012 |
| CN | 102568457 A | 7/2012 |
| CN | 103823867 A | 5/2014 |
| CN | 104978962 A | 10/2015 |
| WO | WO 2010140166 A2 | 12/2010 |

OTHER PUBLICATIONS

Office Action to corresponding Chinese Application 201610171165.4, dated Nov. 12, 2018, pp. 6.
International Search Report and Written Opinion with English translations dated Jun. 26, 2017 for PCT Application No. PCT/CN2017/077829, 19 pages.
Office Action dated Feb. 22, 2019 with concise English translation for Chinese Application No. 201610171165.4, 8 pages.

\* cited by examiner

300

```
┌─────────────────────────────────────────────────────────────────────┐  301
│ Obtain an original pitch sequence of a to-be-identified audio, the original │
│ pitch sequence being used to indicate a frequency of the to-be-identified audio │
│                         at each time point                          │
└─────────────────────────────────────────────────────────────────────┘
                                   ↓                                     302
┌─────────────────────────────────────────────────────────────────────┐
│   Divide the original pitch sequence into a plurality of pitch sub-sequences   │
└─────────────────────────────────────────────────────────────────────┘
                                   ↓                                     303
┌─────────────────────────────────────────────────────────────────────┐
│   Respectively identify the original pitch sequence and the plurality of pitch │
│                            sub-sequences                            │
└─────────────────────────────────────────────────────────────────────┘
                                   ↓                                     304
┌─────────────────────────────────────────────────────────────────────┐
│  For each sequence in the original pitch sequence and the plurality of pitch │
│  sub-sequences, score N sequence samples according to matching degrees │
│  respectively between the N sequence samples included in an identification │
│  result corresponding to the sequence and the sequence, the matching degree │
│  between the sequence sample and the sequence being directly proportional to │
│                       a score of the sequence sample                │
└─────────────────────────────────────────────────────────────────────┘
                                   ↓                                     305
┌─────────────────────────────────────────────────────────────────────┐
│  Sort, according to corresponding scores, sequence samples in identification │
│  results respectively corresponding to the original pitch sequence and the │
│                    plurality of pitch sub-sequences                 │
└─────────────────────────────────────────────────────────────────────┘
                                   ↓                                     306
┌─────────────────────────────────────────────────────────────────────┐
│  Obtain an identification result of the to-be-identified audio according to a │
│                            sorting result                           │
└─────────────────────────────────────────────────────────────────────┘
```

```
                                                                         302a
┌─────────────────────────────────────────────────────────────────────┐
│  Determine mute sequences included in the original pitch sequence,  │
│         the mute sequence being a sequence whose pitch value is 0   │
└─────────────────────────────────────────────────────────────────────┘
                                   ↓                                     302b
┌─────────────────────────────────────────────────────────────────────┐
│      Determine, according to lengths of the mute sequences, that a  │
│   location of at least one of the mute sequences in the original pitch │
│                       sequence is a division location              │
└─────────────────────────────────────────────────────────────────────┘
                                   ↓                                     302c
┌─────────────────────────────────────────────────────────────────────┐
│      Divide the original pitch sequence according to the determined │
│        division location, to obtain the plurality of pitch sub-sequences │
└─────────────────────────────────────────────────────────────────────┘
```

FIG. 4

AUDIO IDENTIFICATION METHOD AND APPARATUS, AND COMPUTER STORAGE MEDIUM

CROSS-REFERENCE TO RELATED APPLICATION(S)

This application is a continuation of International Patent Application No. PCT/CN2017/077829, filed on Mar. 23, 2017, which claims priority to Chinese Patent Application No. 2016101711654, filed with the State Intellectual Property Office of the People's Republic of China on Mar. 24, 2016, the entirety of all of which are hereby incorporated by reference herein.

FIELD OF THE TECHNOLOGY

The present disclosure relates to the field of audio processing technologies, and in particular, to an audio identification method and apparatus, and a computer storage medium storing processor executable instructions for implementing the audio identification method.

BACKGROUND OF THE DISCLOSURE

With continuous development of network application technologies, functions of music playback applications also become increasingly improved, with humming identification being one newly developed function.

In a humming identification system, a user enables a humming identification function of a music playback application in a terminal, and hums a piece of music to a microphone of a computing device executing the music playback application. Then, the computing device extracts a pitch sequence of a portion of the recorded humming voice, and then sends the pitch sequence to a server. The server compares the pitch sequence with a pitch sequence of a song stored in a song library, searches the song library for a song that best matches the pitch sequence, and returns a searching result to the computing device.

However, the humming identification system has been found to include the following technical problems. For example, when a user hums only a short portion of a song's melody, the short portion of the song's melody may not satisfy a shortest length requirement for existing humming identification system to accurately analyse and identify a matching song. Therefore, the user is required to hum the melody for a long period of time, which is not helpful when the user does not know more of the melody, which results in lowered accuracy the longer the user is asked to hum. Consequently, the accuracy of the humming identification is relatively low.

SUMMARY

Embodiments of this application provide an audio identification method and apparatus, to resolve a technical problem that related to the low accuracy of audio identification.

In view of this, a first embodiment provides an audio identification method. The method includes, for example, obtaining an original pitch sequence of a to-be-identified audio, where the original pitch sequence is used to indicate a frequency of the to-be-identified audio at each time point. The method may further include dividing the original pitch sequence into a plurality of pitch sub-sequences, respectively identifying the original pitch sequence and the plurality of pitch sub-sequences, and combining identification results obtained by respectively identifying the original pitch sequence and the plurality of pitch sub-sequences, to obtain an identification result of the to-be-identified audio.

A second embodiment provides an audio identification apparatus. The apparatus includes, for example, a sequence obtaining module configured to obtain an original pitch sequence of a to-be-identified audio, where the original pitch sequence is used to indicate a frequency of the to-be-identified audio at each time point. The apparatus may further include a division module configured to divide the original pitch sequence into a plurality of pitch sub-sequences, an identification module configured to respectively identify the original pitch sequence and the plurality of pitch sub-sequences, and a combination module configured to combine identification results obtained by respectively identifying the original pitch sequence and the plurality of pitch sub-sequences, to obtain an identification result of the to-be-identified audio.

A third embodiment provides a computer storage medium, the computer storage medium storing processor-executable instructions that, when executed by a processor, are configured to execute the computer executable instruction to perform an audio identification method. According to the technical solution provided in the embodiments of this application, the audio identification method includes obtaining an original pitch sequence of a to-be-identified audio, where the original pitch sequence is used to indicate a frequency of the to-be-identified audio at each time point. The audio identification method may further include dividing the original pitch sequence of the to-be-identified audio into a plurality of pitch sub-sequences, where the original pitch sequence and the plurality of pitch sub-sequences are respectively identified. The audio identification method may further include respectively identifying the original pitch sequence and the plurality of pitch sub-sequences and combining the original pitch sequence and the plurality of pitch sub-sequences to obtain the identification result of the to-be-identified audio. Therefore, an improvement of the accuracy of humming identification is achieved by dividing a long pitch sequence into a plurality of short pitch sequences, respectively identifying the long pitch sequence and the plurality of short pitch sequences, and combining identification results.

It should be understood that the above general descriptions and the following detailed descriptions are merely for exemplary and explanatory purposes, and do not limit the present disclosure.

BRIEF DESCRIPTION OF THE DRAWINGS

The accompanying drawings, which are incorporated in this specification and constitute a part of this specification, illustrate embodiments consistent with this application and, together with the description, serve to explain the principles of this application.

FIG. 3 shows a flowchart of an audio identification method according to another exemplary embodiment;

FIG. 4 shows a flowchart of a pitch sequence division method according to an exemplary embodiment;

DETAILED DESCRIPTION

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present disclosure. On the contrary, the implementations are examples of apparatuses and methods that are described in detail in the appended claims and that are consistent with some aspects of the present disclosure. It should be understood that, the preferred embodiments described below are merely used for describing and explaining this application, and are not limiting to this application.

Figure 1:
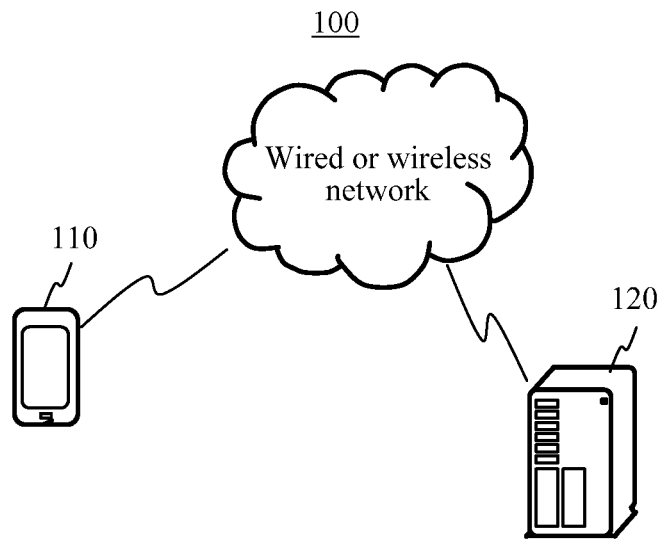
FIG. 1 shows a schematic diagram of an implementation environment according to embodiments of this application.

FIG. 1 shows a schematic diagram of an implementation environment 100 according to embodiments of this application. As shown in FIG. 1, the implementation environment 100 includes a terminal 110 and a server 120.

The terminal 110 may be a smartphone, a tablet computer, a laptop portable computer, a personal computer, or another like computing device.

The server 120 may be an independent server, or the server 120 may alternatively be a server cluster formed by a plurality of servers that respectively implement different functions, or the server 120 may alternatively be a cloud computing center.

The terminal 110 and the server 120 are connected to each other and exchange data by using a wired or wireless network.

Figure 2:
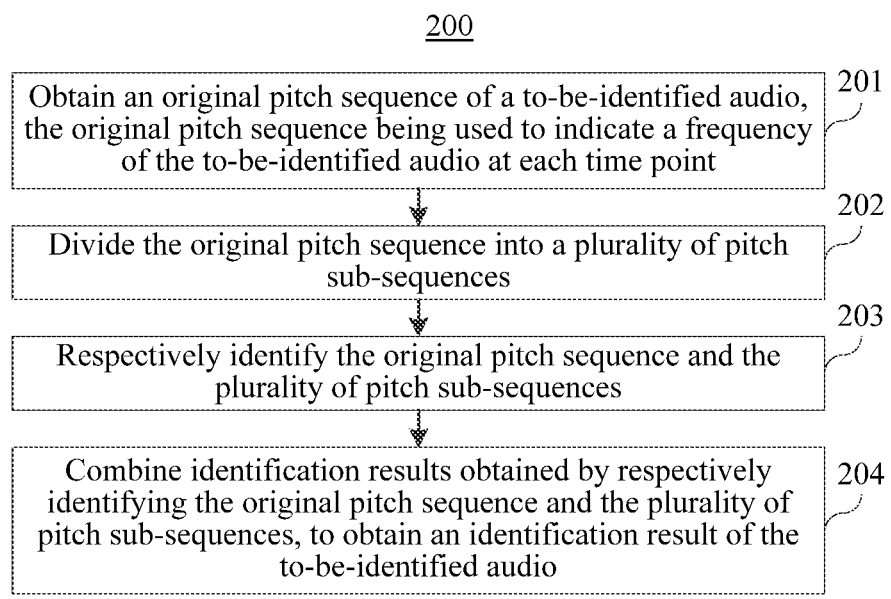
FIG. 2 shows a flowchart of an audio identification method according to an exemplary embodiment.

FIG. 2 shows a flowchart 200 of an audio identification method according to an exemplary embodiment. The method may be implemented in the implementation environment 100 shown in the foregoing FIG. 1. As shown in FIG. 2, the audio identification method may include the following steps:

Step 201: Obtain an original pitch sequence of a to-be-identified audio, the original pitch sequence being used to indicate a frequency of the to-be-identified audio at each time point.

Step 202: Divide the original pitch sequence into a plurality of pitch sub-sequences.

Step 203: Respectively identify the original pitch sequence and the plurality of pitch sub-sequences.

Step 204: Combine identification results obtained by respectively identifying the original pitch sequence and the plurality of pitch sub-sequences, to obtain an identification result of the to-be-identified audio.

Thus, according to the audio identification method provided in this embodiment of this application, the original pitch sequence of the to-be-identified audio is divided into the plurality of pitch sub-sequences, the original pitch sequence and the plurality of pitch sub-sequences are respectively identified, and the identification results obtained by respectively identifying the original pitch sequence and the plurality of pitch sub-sequences are combined, to obtain the identification result of the to-be-identified audio. Therefore, an improvement to the accuracy of humming identification is achieved by dividing a long pitch sequence into a plurality of short pitch sequences, respectively identifying the long pitch sequence and the plurality of short pitch sequences, and combining identification results.

FIG. 3 shows a flowchart 300 of an audio identification method according to another exemplary embodiment. The method may be implemented in the implementation environment 100 shown in the foregoing FIG. 1. As shown in FIG. 3, the audio identification method may include the following steps:

Step 301: Obtain an original pitch sequence of a to-be-identified audio, the original pitch sequence being used to indicate a frequency of the to-be-identified audio at each time point.

The to-be-identified audio may be an audio collected by the terminal 110 in the implementation environment 100 shown in the foregoing FIG. 1 by using a built-in or an external audio collection unit (such as a microphone). For example, using an example in which the terminal is a smartphone, after a user opens a music play application (APP) in the smartphone and enables a humming identification function, the user hums a piece of audio to a microphone of the smartphone. The smartphone of the microphone obtains the collected audio as the to-be-identified audio.

Pitches of the to-be-identified audio at play time points are extracted in sequence, that is, the original pitch sequence may be obtained. A pitch is a level of sound and is a basic characteristic of sound. The pitch is determined by a vibration frequency, and the pitch is in direct proportion to the vibration frequency.

Step 302: Divide the original pitch sequence into a plurality of pitch sub-sequences.

In the original pitch sequence, a pitch value 0 indicates that a user pauses at a time point corresponding to the value 0 when recording the to-be-identified audio. More continuous values 0 indicate a longer time that the user pauses for. Therefore, in the solution shown in this embodiment, the original pitch sequence may be divided according to a location of the pitch whose value is 0 in the original pitch sequence.

Step 303: Respectively identify the original pitch sequence and the plurality of pitch sub-sequences.

In the method shown in this embodiment, there are various manners of the respectively identifying the original pitch sequence and the plurality of pitch sub-sequences. Two optional embodiments are provided below:

Optional Embodiment 1

To reduce complexity of matching calculation, in step 303, the original pitch sequence may be matched with preset sequence samples by using a first matching algorithm, n sequence samples are determined according to matching values between the preset sequence samples and the original pitch sequence in descending order, and then the original pitch sequence and the plurality of pitch sub-sequences are respectively matched with the n sequence samples by using a second matching algorithm.

Optional Embodiment 2

In step 303, the original pitch sequence and the pitch sub-sequence may alternatively be matched with preset sequence samples by respectively using a first matching algorithm and a second matching algorithm. That is, any sequence in the original pitch sequence and the plurality of pitch sub-sequences is matched with the preset sequence samples by using the first matching algorithm, and n sequence samples having highest matching values between the preset sequence samples and the sequence are determined; and then any sequence in the original pitch sequence and the plurality of pitch sub-sequences is matched with the n sequence samples by using the second matching algorithm.

In the optional embodiment 2, the matching any sequence in the original pitch sequence and the plurality of pitch sub-sequences with the preset sequence samples by using the first matching algorithm, and determining n sequence samples having highest matching values between the preset sequence samples and the sequence includes: respectively using the original pitch sequence and the pitch sub-sequences as to-be-matched sequences based on the first matching algorithm, respectively matching the to-be-matched sequences with preset sequence samples, and determining the n sequence samples corresponding to the to-be-matched sequences according to matching values between the preset sequence samples and the to-be-matched sequences in descending order.

For example, the original pitch sequence is divided into two pitch sub-sequences, which are respectively a pitch sub-sequence 1 and a pitch sub-sequence 2. The original pitch sequence is matched with the preset sequence samples based on the first matching algorithm, to obtain three sequence samples having highest matching values. It is assumed that the three sequence samples are respectively a sequence sample A, a sequence sample B, and a sequence sample C. The pitch sub-sequence 1 is also matched with the preset sequence samples based on the first matching algorithm, to obtain three sequence samples having highest matching degrees with the pitch sub-sequence 1. In this embodiment, it is assumed that the three sequence samples are the sequence sample A, the sequence sample B, and a sequence sample D. The pitch sub-sequence 2 is matched with the sequence samples based on the first matching algorithm, to obtain three sequence samples having highest matching values with the pitch sub-sequence 2. In this embodiment, it is assumed that the three sequence samples are the sequence sample A, the sequence sample B, and a sequence sample E.

The matching any sequence in the original pitch sequence and the plurality of pitch sub-sequences with the n sequence samples by using the second matching algorithm includes: matching, by using the second matching algorithm, the original pitch sequence with the n sequence samples having highest matching values with the original pitch sequence that are obtained by using the first matching algorithm, and based on the foregoing example, including: matching the original pitch sequence with the sequence sample A, the sequence sample B, and the sequence sample C by using the second matching algorithm, to obtain parameters representing matching degrees, such as the matching degree values between the original pitch sequence and the sequence sample A, between the original pitch sequence and the sequence sample B, and between the original pitch sequence and the sequence sample C; and matching, by using the second matching algorithm, an $m^{th}$ pitch sub-sequence with the n sequence samples having highest matching values with the $m^{th}$ pitch sub-sequence that are obtained by using the first matching algorithm, m being at least one integer of 1 to the total number of the pitch sub-sequences.

Based on the foregoing example, the matching, by using the second matching algorithm, the pitch sub-sequence with the sequence samples may include: matching the pitch sub-sequence 1 with the sequence sample A, the sequence sample B, and the sequence sample D based on the second matching algorithm, to respectively obtain the matching degrees between the pitch sub-sequence 1 and the sequence sample A, between the pitch sub-sequence 1 and the sequence sample B, and between the pitch sub-sequence 1 and the sequence sample D; and matching the pitch sub-sequence 2 with the sequence sample A, the sequence sample B, and the sequence sample E based on the second matching algorithm, to respectively obtain the matching degrees between the pitch sub-sequence 2 and the sequence sample A, between the pitch sub-sequence 2 and the sequence sample B, and between the pitch sub-sequence 2 and the sequence sample E.

The precision of the first matching algorithm is lower than that of the second matching algorithm. For example, the first matching algorithm may be an empirical mode decomposition (EMD) algorithm, a linear scale algorithm, or the like. The second matching algorithm may be a dynamic time warping (DTW) algorithm. During matching, matching degree calculation may be performed on the original pitch sequence and pre-stored sequence samples by using the first matching algorithm, n sequence samples having highest matching degrees with the original pitch sequence are rapidly determined, and then matching degrees respectively between the original pitch sequence and the n sequence samples and between the plurality of pitch sub-sequences and the n sequence samples are calculated by using the second matching algorithm. Alternatively, matching may be performed based on the optional embodiment 2 by using the EMD as the first matching algorithm, and using the DTW as the second matching algorithm. In this embodiment, several audios (such as songs) may be pre-stored. Each of the foregoing sequence samples is a pitch sequence of one of the pre-stored audios.

It should be noted that, in step 302 and step 303, the dividing the original pitch sequence into a plurality of pitch sub-sequences may be performed before step 303, or may be performed in a process of performing step 303. For example, the original pitch sequence may be divided into the plurality of pitch sub-sequences first, then the original pitch sequence is matched with the preset sequence samples by using the first matching algorithm, and finally, the original pitch sequence and the plurality of pitch sub-sequences are respectively matched with the n sequence samples by using the second matching algorithm. Alternatively, the original pitch sequence is matched with the preset sequence samples by using the first matching algorithm first, then the original pitch sequence may be divided into the plurality of pitch sub-sequences, and finally, the original pitch sequence and the plurality of pitch sub-sequences are respectively matched with the n sequence samples by using the second matching algorithm.

Step 304: For each sequence in the original pitch sequence and the plurality of pitch sub-sequences, score N sequence samples according to matching degrees respectively between the N sequence samples included in an identification result corresponding to the sequence and the sequence, the matching degree between the sequence sample and the sequence being directly proportional to a score of the sequence sample.

For each sequence in the original pitch sequence and the plurality of pitch sub-sequences, the identification result corresponding to the sequence includes the N sequence samples and the matching degrees respectively between the N sequence samples and the sequence, N being an integer greater than or equal to 1.

For each sequence in the original pitch sequence and the plurality of pitch sub-sequences, in the N sequence samples corresponding to the sequence, a sequence sample having a higher matching degree with the sequence has a higher score.

Herein, step 304 may be that N sequence samples may be obtained based on a matching result of step 303, where N may be an integer equal to or greater than n.

If in step 303, matching is performed by using the optional embodiment 1, the number of sequence samples matched with the original pitch sequence and the pitch sub-sequence by using the second matching algorithm is n. In this case, N is equal to n.

If in step 303, matching is performed by using the optional embodiment 2, the n sequence samples matched with the original pitch sequence by using the second matching algorithm are different from the n sequence samples matched with the pitch sub-sequence by using the second matching algorithm. In this case, the number of sequence samples matched with the original pitch sequence and the pitch sub-sequence by using the second matching algorithm exceeds n, and may be S greater than n, where N is equal to S that is greater than n.

For example, in the foregoing example, the three sequence samples mostly matched with the original pitch sequence by using the first matching algorithm are the sequence sample A, the sequence sample B, and the sequence sample C; the three sequence samples mostly matched with the pitch sub-sequence 1 by using the first matching algorithm are the sequence sample A, the sequence sample B, and the sequence sample D; and the three sequence samples mostly matched with the pitch sub-sequence 2 by using the first matching algorithm are the sequence sample A, the sequence sample B, and the sequence sample E. In this case, N is equal to 5, that is, is greater than 3.

In this embodiment, the scoring N sequence samples may include:

When the optional embodiment 1 is used in step 303, scoring may be performed based on matching degrees respectively between each of the sequence samples and the original pitch sequence and between each of the sequence samples and the pitch sub-sequences. For example, if the matching degrees between the sequence samples and the original pitch sequence and between the sequence samples and the pitch sub-sequences are represented by using matching values, weighted calculation may be performed on the matching values respectively between the sequence samples and the original pitch sequence and between the sequence samples and the pitch sub-sequences to obtain weighted values, and then final scores of the N sequence samples are determined based on the weighted values.

When the optional embodiment 2 is used in step 303, weighted calculation may be performed on the matching values respectively between the N sequence samples and the original pitch sequence and between the N sequence samples and the pitch sub-sequences to obtain weighted values; and scoring is performed based the weighted values. In this case, because some sequence samples match only some sequences in the original pitch sequence and the pitch sub-sequences, weighted values are small and corresponding scores are low.

Step 305: Sort, according to corresponding scores, sequence samples in identification results respectively corresponding to the original pitch sequence and the plurality of pitch sub-sequences. In step 305, scores obtained in step 304 may be sorted.

Step 306: Obtain an identification result of the to-be-identified audio according to a sorting result. In step 306, one or more sequence samples whose scores rank high may be selected and output as the identification result of the to-be-identified audio.

In the identification results respectively corresponding to the original pitch sequence and the plurality of pitch sub-sequences, audios corresponding to M sequence samples having highest total scores is the identification result of the to-be-identified audio, and basic information such as a name of the audio in the identification result is pushed to a user. In this example, M is an integer not greater than n.

In this embodiment, the N sequence samples having relatively high matching degrees with the original pitch sequence and the plurality of pitch sub-sequences may be matched. The N sequence samples may be sorted according to the matching degrees in descending order, and values are assigned to ranks by using an inverted index accumulation method. A higher rank indicates a higher assigned value. Then, all the sequence samples involved in the identification results of the original pitch sequence and the plurality of pitch sub-sequences are sorted according to total scores in descending order, and the audios corresponding to the M sequence samples that rank high in the sorting result are obtained as the identification result. For example, referring to Table 1:

TABLE 1

| Original pitch sequence | | Pitch sub-sequence 1 | | Pitch sub-sequence 2 | | Pitch sub-sequence 3 | |
|---|---|---|---|---|---|---|---|
| Sample | Value | Sample | Value | Sample | Value | Sample | Value |
| Sample 1 | 1 | Sample 1 | 1 | Sample 2 | 1 | Sample 1 | 1 |
| Sample 2 | ½ | Sample 3 | ½ | Sample 1 | ½ | Sample 2 | ½ |
| Sample 3 | ⅓ | Sample 5 | ⅓ | Sample 6 | ⅓ | Sample 7 | ⅓ |
| Sample 4 | ¼ | Sample 2 | ¼ | Sample 5 | ¼ | Sample 8 | ¼ |
| Sample 5 | ⅕ | Sample 6 | ⅕ | Sample 7 | ⅕ | Sample 3 | ⅕ |

In Table 1, the identification results of the original pitch sequence and the plurality of pitch sub-sequences respectively include five sequence samples. The involved sequence samples include a sample 1 to a sample 8. The total score of the sample 1 is $1+1+½+1=3.5$, the total score of the sample 2 is $½+¼+1+½=2.25$, the total score of the sample 3 is $⅓+½+⅕≈1.03$, the total score of the sample 4 is 0.25, the total score of the sample 5 is $⅕+⅓+¼≈0.78$, the total score of the sample 6 is $⅕+⅓≈0.53$, the total score of the sample 7 is $⅕+⅓≈0.53$, and the total score of the sample 8 is 0.25. Therefore, a descending order of the sequence samples according to the total scores is: the sample 1, the sample 2, the sample 3, the sample 5, the sample 6, the sample 7, the sample 4, and the sample 8. Audios corresponding to five sequence samples having highest total scores, that is, the sample 1, the sample 2, the sample 3, the sample 5, and the sample 6 are obtained as a final identification result and are pushed to a user. It can be learned based on Table 1 that, in this case, n is equal to 5, N is equal to 8, and M is equal to 5.

Alternatively, in the solution shown in this embodiment, point calculation is performed based on Table 1 in combination with the matching degrees between the original pitch sequence and the sequence sample and between the plurality of pitch sub-sequences and the sequence sample in the identification results. For example, after values are assigned to ranks by using the inverted index accumulation method, a product of the value assigned to the rank of each sequence sample and its corresponding matching value is used as a point of the sequence sample. For example, referring to Table 2:

TABLE 2

| Original pitch sequence | | | Pitch sub-sequence 1 | | | Pitch sub-sequence 2 | | | Pitch sub-sequence 3 | | |
|---|---|---|---|---|---|---|---|---|---|---|---|
| Sample | Value | Matching value | Sample | Value | Matching value | Sample | Value | Matching value | Sample | Value | Matching value |
| Sample 1 | 1 | 0.98 | Sample 1 | 1 | 0.86 | Sample 2 | 1 | 0.99 | Sample 1 | 1 | 0.93 |
| Sample 2 | ½ | 0.90 | Sample 3 | ½ | 0.76 | Sample 1 | ½ | 0.94 | Sample 2 | ½ | 0.91 |
| Sample 3 | ⅓ | 0.87 | Sample 5 | ⅓ | 0.71 | Sample 6 | ⅓ | 0.90 | Sample 7 | ⅓ | 0.74 |
| Sample 4 | ¼ | 0.83 | Sample 2 | ¼ | 0.69 | Sample 5 | ¼ | 0.88 | Sample 8 | ¼ | 0.71 |
| Sample 5 | ⅕ | 0.70 | Sample 6 | ⅕ | 0.63 | Sample 7 | ⅕ | 0.85 | Sample 3 | ⅕ | 0.70 |

In Table 2, the identification results of the original pitch sequence and the plurality of pitch sub-sequences respectively include five sequence samples. The involved sequence samples include a sample 1 to a sample 8. The total score of the sample 1 is 2.32, the total score of the sample 2 is 1.0925, the total score of the sample 3 is 0.81, the total score of the sample 4 is 0.2075, the total score of the sample 5 is 0.5967, the total score of the sample 6 is 0.426, the total score of the sample 7 is 0.4167, and the total score of the sample 8 is 0.1775. Therefore, a descending order of the sequence samples according to the total scores is: the sample 1, the sample 2, the sample 3, the sample 5, the sample 6, the sample 7, the sample 4, and the sample 8. Audios corresponding to five sequence samples having highest total scores, that is, the sample 1, the sample 2, the sample 3, the sample 5, and the sample 6 are obtained as a final identification result and are pushed to a user.

Alternatively, in the solution shown in this embodiment, point calculation is performed based on Table 2 in combination with sequence lengths of the original pitch sequence and the plurality of pitch sub-sequences. For example, after values are assigned to ranks by using the inverted index accumulation method, a product of the value assigned to the rank of each sequence sample, its corresponding matching value, and the length of its corresponding original pitch sequence or pitch sub-sequence is used as a point of the sequence sample.

It should be noted that, all of the foregoing steps may be performed by the terminal 110 in the implementation environment 100 shown in FIG. 1. For example, using an example in which the terminal 110 is a smartphone, a music play APP is installed in the smartphone, and the music play APP has a humming identification function, after a user enables the humming identification function, the user hums a piece of audio to a microphone of the smartphone, the smartphone performs pitch sequence extraction, division, and matching processing on the piece of audio according to the method shown in step 301 to step 306, and the smartphone finally displays several songs mostly matched with the audio hummed by the user.

Alternatively, all of the foregoing steps may be performed by the server 120 in the implementation environment 100 shown in FIG. 1. For example, using an example in which the terminal 110 is a smartphone installed with a music play APP, and the server 120 is a server corresponding to the music play APP, after a user enables a humming identification function of the music play APP, the user hums a piece of audio to a microphone of the smartphone, the smartphone sends the collected audio to the server, the server performs pitch sequence extraction, division, and matching processing on the piece of audio according to the method shown in step 301 to step 306, and the server finally returns several songs mostly matched with the audio hummed by the user to the smartphone. The songs are displayed by the smartphone to the user.

Alternatively, some of the foregoing steps may be performed by the terminal 110 in the implementation environment 100 shown in FIG. 1, and other steps are performed by the server 120. For example, using an example in which the terminal 110 is a smartphone installed with a music play APP, and the server 120 is a server corresponding to the music play APP, after a user enables a humming identification function of the music play APP, the user hums a piece of audio to a microphone of the smartphone. The smartphone performs pitch sequence extraction and division on the piece of audio according to the method shown in step 301 and step 302, and sends obtained original pitch sequence and pitch sub-sequences to the server. The server performs matching identification according to the method shown in step 303 to step 306, and finally returns several songs mostly matched with the audio hummed by the user to the smartphone. The songs are displayed by the smartphone to the user.

Thus, according to the audio identification method provided in this embodiment of this application, the original pitch sequence of the to-be-identified audio is divided into the plurality of pitch sub-sequences, the original pitch sequence and the plurality of pitch sub-sequences are respectively identified, and the identification results obtained by respectively identifying the original pitch sequence and the plurality of pitch sub-sequences are combined, to obtain the identification result of the to-be-identified audio. Therefore, an effect of improving the accuracy of humming identification is achieved by dividing a long pitch sequence into a plurality of short pitch sequences, respectively identifying the long pitch sequence and the plurality of short pitch sequences, and combining identification results.

In embodiment step 302 corresponding to the foregoing FIG. 3, when the original pitch sequence is divided into the plurality of pitch sub-sequences, a division point may be selected according to lengths of continuous 0 value pitches in descending order. Referring to FIG. 4, FIG. 4 shows a flowchart 400 of a pitch sequence division method according to an exemplary embodiment. As shown in FIG. 4, the audio identification method may include the following steps:

Step 302a: Determine mute sequences included in the original pitch sequence, the mute sequence being a sequence whose pitch value is 0.

For example, it is assumed that an original pitch sequence of a to-be-identified audio is:
{7.58, 7.58, 7.58, 7.58, 7.50, 7.50, 7.50, 7.50, 0, 0, 0, 0, 0, 7.33, 7.33, 0, 0, 7.33, 7.33, 0, 0, 0, 0, 7.17, 0, 7.17, 7.17, 7.17, 7.17, 7.17} (This is a simplified example. In an actual application, the length of a non-mute section is relatively long and the length is generally at least 20 pitch values.) In the foregoing original pitch sequence, there are four mute sequences in total, which may be respectively marked as $z_1$, $z_2$, $z_3$, and $z_4$, and their lengths are respectively 5, 2, 4, and 1.

Step 302b: Determine, according to lengths of the mute sequences, that a location of at least one of the mute sequences in the original pitch sequence is a division location.

Because a longer length of the mute sequence indicates a longer pause period at the mute sequence when a user records the to-be-identified audio, the probability that audios corresponding to two pitch sequences on two sides of the mute sequence are two independent audios is also high; and otherwise, the probability that the audios corresponding to the two pitch sequences are two independent audios is low. Therefore, to improve the accuracy of sequence division and improve the subsequent identification effect, in this embodiment, division may be performed according to the lengths of the mute sequences in descending order, that is, division is performed preferentially at a location of a long mute sequence.

Specifically, during division location determining, whether the number of the mute sequences is greater than m may be determined, m being an integer greater than or equal to 1; and if a determining result is that the number of the mute sequences is not greater than m, it is determined that locations of the mute sequences in the original pitch sequence are division locations; or if a determining result is that the number of the mute sequences is greater than m, it is determined that locations of k mute sequences having longest lengths in the mute sequences in the original pitch sequence are division locations, where k is less than or equal to m, and k is a positive integer. Values of m and k may be preset to a fixed value, or may be automatically set according to the length of the original pitch sequence. Alternatively, values of m and k may be set by a user.

For example, the number of the foregoing mute sequences is 4. If the value of m is 4 or 5, the number of the mute sequences is not greater than m, so that it may be determined that locations of all of the foregoing four mute sequences $z_1$, $z_2$ $z_3$, and $z_4$ in the original pitch sequence are division locations; or if the value of m is 3 and k is 2, the number of the mute sequences is greater than m, so that it may be determined that locations of two longest mute sequences $z_1$ and $z_3$ in the foregoing four mute sequences in the original pitch sequence are division locations.

Alternatively, during division location determining, it may be determined that a location of a mute sequence whose length is greater than a preset length threshold in the mute sequences in the original pitch sequence is the division location. For example, if the preset length threshold is 3, it is determined that locations of mute sequences whose lengths are greater than 3, that is, mute sequences $z_1$ and $z_3$, in the foregoing mute sequences $z_1$, $z_2$, $z_3$, and $z_4$ in the original pitch sequence are division locations.

Step 302c: Divide the original pitch sequence according to the determined division location, to obtain the plurality of pitch sub-sequences.

It should be noted that in this embodiment, when the original pitch sequence is divided according to the determined division location, the mute sequence at the division location is removed from divided pitch sub-sequences.

Using the original pitch sequence under step 302a as an example, if it is determined that the location of the mute sequence $z_1$ in the original pitch sequence is the division location, the foregoing example may be divided into two sections {7.58, 7.58, 7.58, 7.58, 7.50, 7.50, 7.50, 7.50} and {7.33, 7.33, 0, 0, 7.33, 7.33, 0, 0, 0, 0, 7.17, 0, 7.17, 7.17, 7.17, 7.17, 7.17} by using $z_1$ as a boundary; or if it is determined that the locations of the mute sequences $z_1$ and $z_3$ in the original pitch sequence are division locations, the foregoing example may be divided into three sections, which are respectively {7.58, 7.58, 7.58, 7.58, 7.50, 7.50, 7.50, 7.50}, {7.33, 7.33, 0, 0, 7.33, 7.33}, and {7.17, 0, 7.17, 7.17, 7.17, 7.17, 7.17}. Mute sequences used as boundaries are also discarded during the division.

To sum up, according to the pitch sequence division method provided in this embodiment, the mute sequences included in the original pitch sequence are determined; it is determined, according to the lengths of the mute sequences, that the location of the at least one of the mute sequences in the original pitch sequence is the division location; and the original pitch sequence is divided according to the determined division location, that is, divided preferentially at a location of a long mute sequence, thereby improving the accuracy of sequence division and improving the subsequent identification effect.

Figure 5:
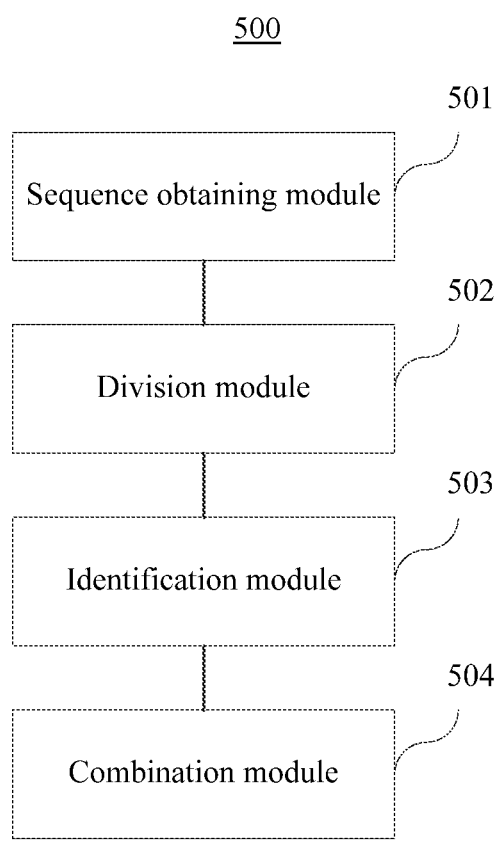
FIG. 5 shows a block diagram of an audio identification apparatus according to an exemplary embodiment.

Referring to FIG. 5, FIG. 5 shows a structural block diagram of an audio identification apparatus 500 according to an embodiment. The audio identification apparatus may be implemented by using hardware, or a combination of software and hardware. For example, the audio identification apparatus 500 may be the server 120 or a part of the server 120 in the implementation environment 100 shown in the foregoing FIG. 1. The audio identification apparatus 500 may include: a sequence obtaining module 501, configured to obtain an original pitch sequence of a to-be-identified audio, the original pitch sequence being used to indicate a frequency of the to-be-identified audio at each time point; a division module 502, configured to divide the original pitch sequence into a plurality of pitch sub-sequences; an identification module 503, configured to respectively identify the original pitch sequence and the plurality of pitch sub-sequences; and a combination module 504, configured to combine identification results obtained by respectively identifying the original pitch sequence and the plurality of pitch sub-sequences, to obtain an identification result of the to-be-identified audio.

To sum up, the audio identification apparatus 500 provided in this embodiment divides the original pitch sequence of the to-be-identified audio into the plurality of pitch sub-sequences, respectively identifies the original pitch sequence and the plurality of pitch sub-sequences, and combines the identification results obtained by respectively identifying the original pitch sequence and the plurality of pitch sub-sequences, to obtain the identification result of the to-be-identified audio. Therefore, an effect of improving the accuracy of humming identification is achieved by dividing a long pitch sequence into a plurality of short pitch sequences, respectively identifying the long pitch sequence and the plurality of short pitch sequences, and combining identification results.

Figure 6:
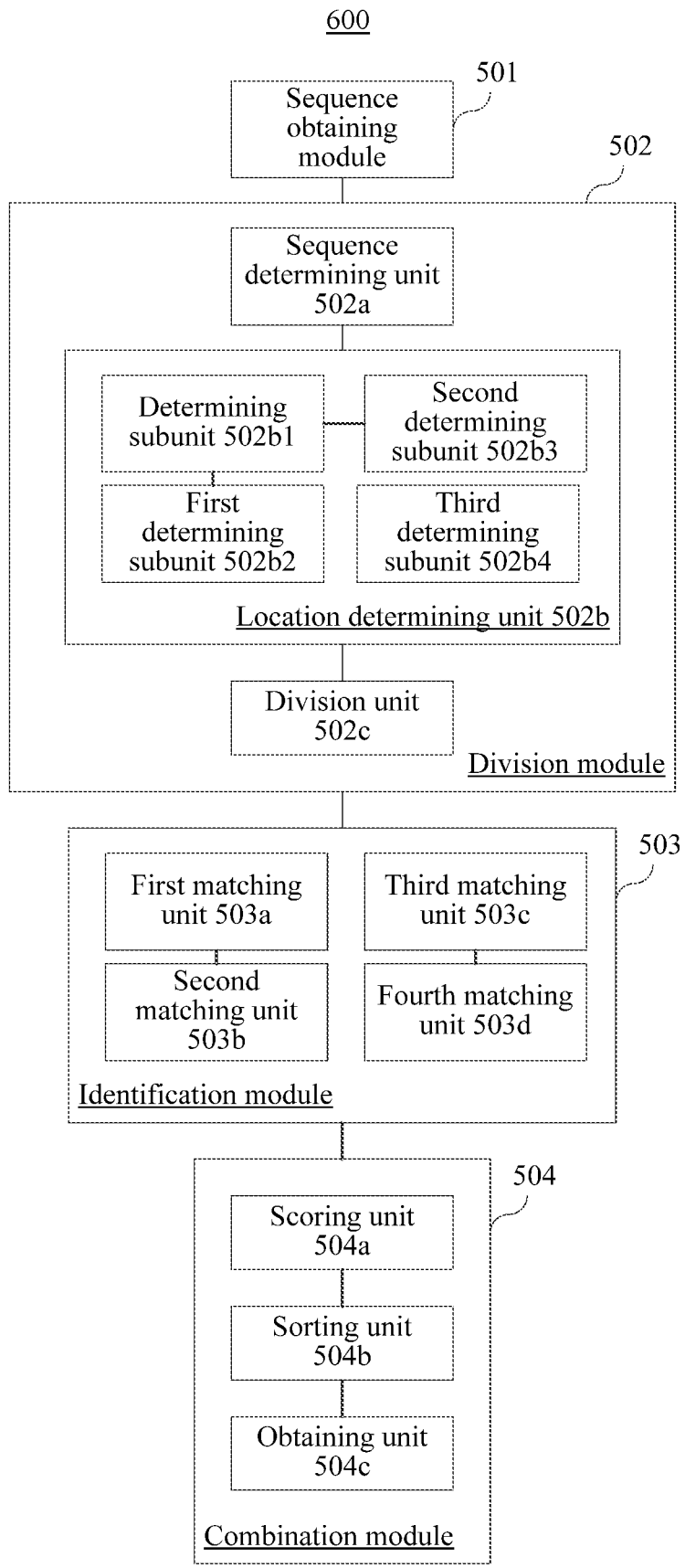
FIG. 6 shows a block diagram of an audio identification apparatus according to another exemplary embodiment.

Referring to FIG. 6, FIG. 6 shows a structural block diagram of an audio identification apparatus 600 according to another embodiment, based on components found in the audio identification apparatus 500 shown in FIG. 5. The audio identification apparatus 600 may be implemented by using hardware, or a combination of software and hardware. For example, the audio identification apparatus 600 may be the server 120 or a part of the server 120 in the implementation environment 100 shown in the foregoing FIG. 1.

The audio identification apparatus 600 may include: a sequence obtaining module 501, configured to obtain an original pitch sequence of a to-be-identified audio, the original pitch sequence being used to indicate a frequency of the to-be-identified audio at each time point; a division module 502, configured to divide the original pitch sequence into a plurality of pitch sub-sequences; an identification module 503, configured to respectively identify the original pitch sequence and the plurality of pitch sub-sequences; and a combination module 504, configured to combine identification results obtained by respectively identifying the original pitch sequence and the plurality of pitch sub-sequences, to obtain an identification result of the to-be-identified audio.

Optionally, the division module 502 may include: a sequence determining unit 502a, configured to determine mute sequences included in the original pitch sequence, the mute sequence being a sequence whose pitch value is 0; a location determining unit 502b, configured to determine, according to lengths of the mute sequences, that a location of at least one of the mute sequences in the original pitch sequence is a division location; and a division unit 502c, configured to divide the original pitch sequence according to the determined division location, to obtain the plurality of pitch sub-sequences.

Optionally, the location determining unit 502b may include: a determining subunit 502b1, configured to determine whether the number of the mute sequences is greater than m, m being an integer greater than or equal to 1; a first determining subunit 502b2, configured to: if a determining result is that the number of the mute sequences is not greater than m, determine that locations of the mute sequences in the original pitch sequence are division location; and a second determining subunit 502b3, configured to: if a determining result is that the number of the mute sequences is greater than m, determine that locations of k mute sequences having longest lengths in the mute sequences in the original pitch sequence are division locations, k being less than or equal to m, and k being a positive integer.

Optionally, the location determining unit 502b may include: a third determining subunit 502b4, configured to determine that a location of a mute sequence whose length is greater than a preset length threshold in the mute sequences in the original pitch sequence is the division location.

Optionally, for each sequence in the original pitch sequence and the plurality of pitch sub-sequences, the identification result corresponding to the sequence includes N sequence samples and matching degrees respectively between the N sequence samples and the sequence, N being an integer greater than or equal to 1. Correspondingly, the identification module 503 is configured to: respectively match the original pitch sequence and the plurality of pitch sub-sequences with sequence samples, to obtain matching degrees respectively between the original pitch sequence and the sequence samples and between the plurality of pitch sub-sequences and the sequence samples; obtain, based on the matching degrees, N sequence samples having highest matching degrees with the original pitch sequence and the plurality of pitch sub-sequences, and matching degrees respectively between the N sequence samples and the original pitch sequence and between the N sequence samples and the plurality of pitch sub-sequences; and form an identification result including the N sequence samples and the matching degrees respectively between the N sequence samples and the original pitch sequence and between the N sequence samples and the plurality of pitch sub-sequences, N being a positive integer greater than 1.

The combination module 504 includes: a scoring unit 504a, configured to: for each sequence in the original pitch sequence and the plurality of pitch sub-sequences, score the N sequence samples according to the matching degrees respectively between the N sequence samples and the sequence included in the identification result corresponding to the sequence, the matching degree between the sequence sample and the sequence being directly proportional to a score of the sequence sample, where the scoring unit 504a herein is mainly configured to score each sequence sample in the N sequence samples according to the matching values in the identification result, the score is directly proportional to the matching degrees between the corresponding sequence sample and the original pitch sequence and between the corresponding sequence sample and the pitch sub-sequence; a sorting unit 504b, configured to sort, according to corresponding scores, sequence samples in the identification results respectively corresponding to the original pitch sequence and the plurality of pitch sub-sequences; and an obtaining unit 504c, configured to obtain the identification result of the to-be-identified audio according to a sorting result.

Optionally, the obtaining unit 504c is configured to obtain audios corresponding to M sequence samples having highest total scores in the identification results respectively corresponding to the original pitch sequence and the plurality of pitch sub-sequences as the identification result of the to-be-identified audio.

Optionally, the identification module 503 includes: a first matching unit 503a, configured to: match the original pitch sequence and preset sequence samples by using a first matching algorithm, and determine n sequence samples according to matching values between the preset sequence samples and the original pitch sequence in descending order, n being an integer greater than or equal to 1; and a second matching unit 503b, configured to respectively match the original pitch sequence and the plurality of pitch sub-sequences with the n sequence samples by using a second matching algorithm.

Optionally, the identification module 503 includes: a third matching unit 503c, configured to: respectively match the original pitch sequence and the plurality of pitch sub-sequences with preset sequence samples by using a first matching algorithm, determine n sequence samples having highest matching degrees with the original pitch sequence, and determine n sequence samples having highest matching degrees with each of the pitch sub-sequences, n being an integer greater than or equal to 1; and a fourth matching unit 503d, configured to: match, by using a second matching algorithm, the original pitch sequence with the n sequence samples having the highest matching values with the original pitch sequence that are obtained by using the first matching algorithm; and match, by using the second matching algorithm, an $m^{th}$ pitch sub-sequence with the n sequence samples having highest matching values with the $m^{th}$ pitch sub-sequence that are obtained by using the first matching algorithm, m being at least one integer of 1 to the total number of the pitch sub-sequences.

Thus, the audio identification apparatus 600 provided in this embodiment divides the original pitch sequence of the to-be-identified audio into the plurality of pitch sub-sequences, respectively identifies the original pitch sequence and the plurality of pitch sub-sequences, and combines the identification results obtained by respectively identifying the original pitch sequence and the plurality of pitch sub-sequences, to obtain the identification result of the to-be-identified audio. Therefore, an effect of improving the accuracy of humming identification is achieved by dividing a long pitch sequence into a plurality of short pitch sequences, respectively identifying the long pitch sequence and the plurality of short pitch sequences, and combining identification results.

In addition, when dividing the original pitch sequence, the audio identification apparatus 600 provided in this embodiment determines the mute sequences included in the original pitch sequence; determines, according to the lengths of the mute sequences, that the location of the at least one of the mute sequences in the original pitch sequence is the division location; and divides the original pitch sequence according to the determined division location, that is, divides preferentially at a location of a long mute sequence, thereby improving the accuracy of sequence division and improving the subsequent identification effect.

Figure 7:
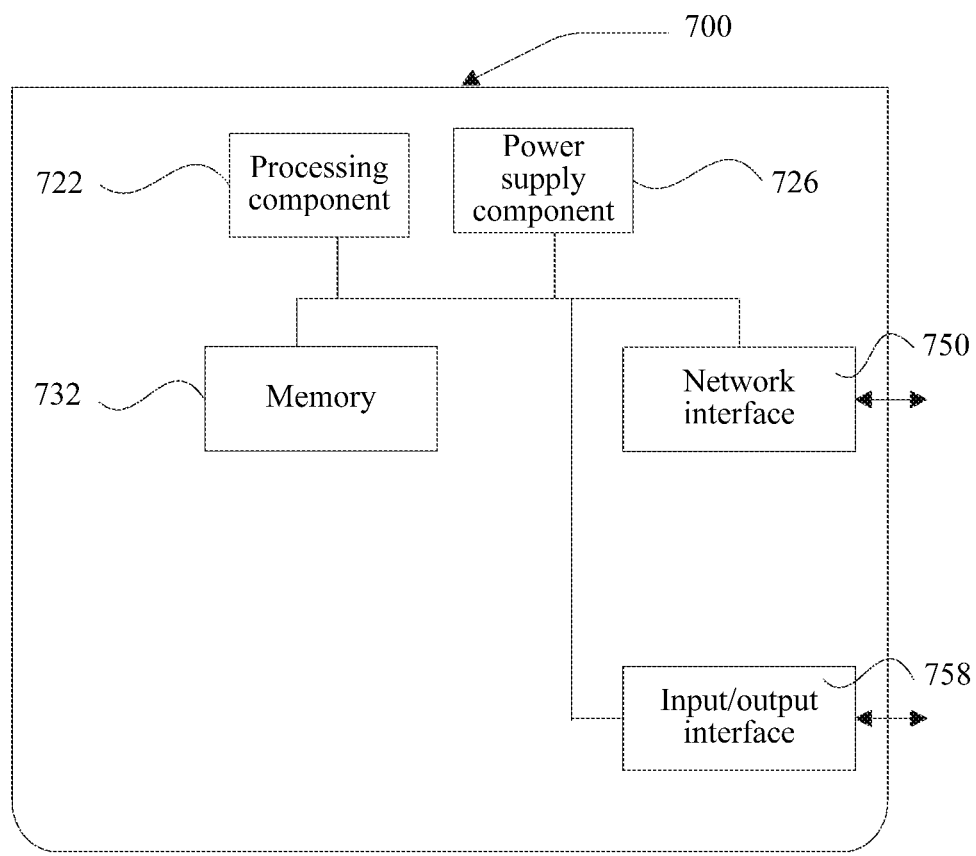
FIG. 7 shows a schematic structural diagram of a server according to an exemplary embodiment.

FIG. 7 shows a schematic structural diagram of a server 700 according to an exemplary embodiment. For example, the server 700 may be the server 120 in the implementation environment 100 shown in FIG. 1. Referring to FIG. 7, the server 700 includes a processing component 722, and the server 700 further includes one or more processors, and a memory resource represented by a memory 732. The memory resource is used to store instructions, for example, an application program, that can be executed by the processing component 722. The application program stored in the memory 732 may include one or more modules each of which corresponds to a set of instructions. In addition, the processing component 722 is configured to execute the instructions, to perform all or some of the steps of any method shown in the foregoing FIG. 2 to FIG. 4.

The server 700 may further include: a power supply component 726, configured to perform power supply management of the server 700; a wired or wireless network interface 750, configured to connect the server 700 to a network; and an input/output (I/O) interface 758. The server 700 may operate an operating system, for example, Windows Server™, Mac OS X™, Unix™, Linux™, FreeBSD™, or the like, that is stored in the memory 732.

Figure 8:
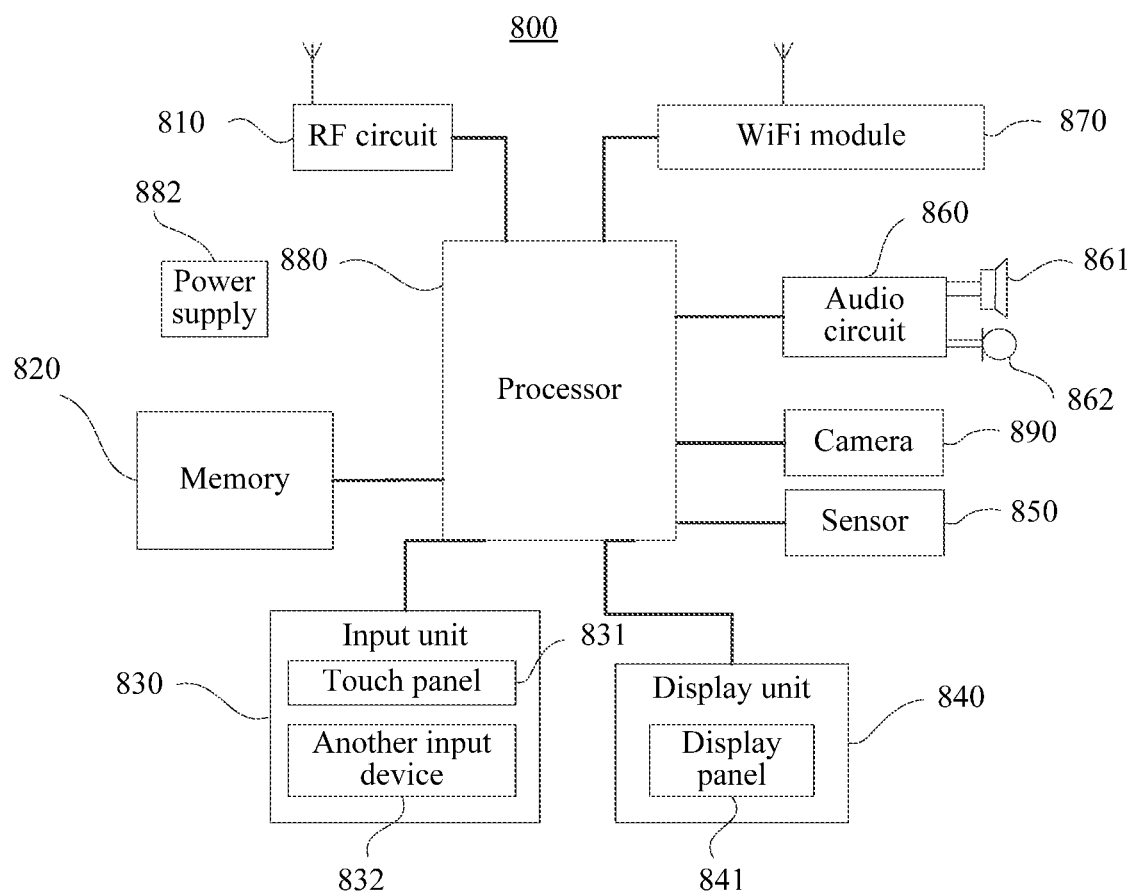
FIG. 8 shows a schematic structural diagram of a terminal according to an exemplary embodiment.

FIG. 8 shows a schematic structural diagram of a terminal 800 according to an exemplary embodiment. The terminal 800 may be the terminal 110 in the implementation environment 100 shown in FIG. 1. The terminal 800 in this embodiment may include one or more components as follows: a processor configured to execute a computer program instruction to complete various processes and methods, a random access memory (RAM) and a read-only memory (ROM) that are configured to store information and a program instruction, a memory configured to store data and information, an I/O device, an interface, an antenna, and the like. Specifically:

The terminal 800 may include components such as a radio frequency (RF) circuit 810, a memory 820, an input unit 830, a display unit 840, a sensor 850, an audio circuit 860, a wireless fidelity (WiFi) module 870, a processor 880, a power supply 882, and a camera 890. A person skilled in the art may understand that the structure of the terminal shown in FIG. 8 does not constitute a limitation to the terminal, and the terminal may include more components or fewer components than those shown in the figure, or some components may be combined, or a different component deployment may be used.

Components of the terminal 800 are specifically described with reference to FIG. 8.

The RF circuit 810 may be configured to receive and send a signal during an information receiving and sending process or a call process. Specifically, the RF circuit receives downlink information from a base station, then delivers the downlink information to the processor 880 for processing, and sends related uplink data to the base station. Generally, the RF circuit includes, but is not limited to, an antenna, at least one amplifier, a transceiver, a coupler, a low noise amplifier (LNA), a duplexer, and the like. In addition, the RF circuit 810 may also communicate with a network and another device by means of wireless communication. The wireless communication may use any communication standard or protocol, which includes, but is not limited to, Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 820 may be configured to store a software program and a module. By running the software program and the module stored in the memory 820, the processor 880 performs various functional applications and data processing of the terminal 800. The memory 820 may mainly include a program storage area and a data storage area. The program storage area may store an operating system, an application program required by at least one function (such as a sound playback function and an image display function), and the like. The data storage area may store data (such as audio data and an address book) created according to use of the terminal 800, and the like. In addition, the memory 820 may include a high speed random access memory, and may further include a non-volatile memory, such as at least one magnetic disk storage device, a flash memory, or other volatile solid-state storage devices.

The input unit 830 may be configured to receive input digit or character information, and generate a keyboard signal input related to the user setting and function control of the terminal 800. Specifically, the input unit 830 may include a touch panel 831 and another input device 832. The touch panel 831, which may also be referred to as a touchscreen, may collect a touch operation of a user on or near the touch panel (such as an operation of a user on or near the touch panel 831 by using any suitable object or accessory such as a finger or a stylus), and drive a corresponding connection apparatus according to a preset program. Optionally, the touch panel 831 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 880. Moreover, the touch controller can receive and execute a command sent by the processor 880. In addition, the touch panel 831 may be a resistive, capacitive, infrared, or surface sound wave type touch panel. In addition to the touch panel 831, the input unit 830 may further include the another input device 832. Specifically, the another input device 832 may include, but is not limited to: one or more of a physical keyboard, a functional key (such as a volume control key or a switch key), a track ball, a mouse, and a joystick.

The display unit 840 may be configured to display information input by a user or information provided to a user, and various menus of the terminal 800. The display unit 840 may include a display panel 841. Optionally, the display panel 841 may be configured by using a liquid crystal display (LCD), an organic light-emitting diode (OLED), or the like. Further, the touch panel 831 may cover the display panel 841. After detecting a touch operation on or near the touch panel 831, the touch panel 831 transfers the touch operation to the processor 880, so as to determine a type of a touch event. Then, the processor 880 provides corresponding visual output on the display panel 841 according to the type of the touch event. Although, in FIG. 8, the touch panel 831 and the display panel 841 are used as two separate parts to implement input and output functions of the terminal 800, in some embodiments, the touch panel 831 and the display panel 841 may be integrated to implement the input and output functions of the terminal 800.

The terminal 800 may further include at least one sensor 850, such as a gyroscope sensor, a magnetic induction sensor, an optical sensor, a motion sensor, and another sensor. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the terminal 800 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the terminal (for example, switching between landscape orientation and portrait orientation, a related game, and magnetometer attitude calibration), a function related to vibration recognition (such as a pedometer and a knock), and the like. Other sensors such as a barometer, a hygrometer, a thermometer, and an infrared sensor, which may be configured in the terminal 800, are not further described herein.

The audio circuit 860, a speaker 862, and a microphone 862 may provide audio interfaces between the user and the terminal 800. The audio circuit 860 may convert received audio data into an electric signal and transmit the electric signal to the speaker 861. The speaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another terminal by using the RF circuit 810, or outputs the audio data to the memory 820 for further processing.

WiFi is a short distance wireless transmission technology. The terminal 800 may help, by using the wireless communications unit 870, the user to receive and send e-mails, browse a web page, access streaming media, and so on, which provides wireless broadband Internet access for the user. Although FIG. 8 shows the WiFi module 870, it may be understood that the WiFi module is not a necessary component of the terminal 800, and when required, the WiFi module may be omitted as long as the scope of the essence of the present disclosure is not changed.

The processor 880 is the control center of the terminal 800, and is connected to various parts of the terminal by using various interfaces and lines. By running or executing the software program and/or module stored in the memory 820, and invoking data stored in the memory 820, the processor 880 performs various functions and data processing of the terminal 800, thereby performing overall monitoring on the terminal. Optionally, the processor 880 may include one or more processing units. Preferably, the processor 880 may integrate an application processor and a modem processor. The application processor mainly processes an operating system, a user interface, an application program, and the like. The modem processor mainly processes wireless communication. It may be understood that the foregoing modem processor may alternatively not be integrated into the processor 880.

The terminal 800 further includes the power supply 882 (such as a battery) for supplying power to the components. Preferably, the power supply may be logically connected to the processor 880 by using a power management system, thereby implementing functions such as charging, discharging, and power consumption management by using the power management system.

The camera 890 is generally formed by a lens, an image sensor, an interface, a digital signal processor, a CPU, a display screen, and the like. The lens is fixed above the image sensor, and a focus may be changed by manually adjusting the lens. The image sensor is equivalent to a "film" of a conventional camera, and is a core of the camera for collecting an image. The interface is configured to connect the camera to a mainboard of the terminal by using a flat cable, a board-to-board connector, and a spring, to send the collected image to the memory 820. The digital signal processor processes the collected image by means of mathematical operations, to convert the collected analog image into a digital image and send the digital image to the memory 820 by using the interface.

Although not shown in the figure, the terminal 800 may further include a Bluetooth module and the like, which are not further described herein.

In addition to one or more processors 880, the terminal 800 further includes a memory, and one or more modules, and the one or more modules are stored in the memory and are configured to be executed by the one or more processors, so as to implement all or some of the steps of the method shown in any one of the foregoing FIG. 2 to FIG. 4. Accordingly, a module described herein may represent software, hardware, and/or circuitry for implementing the attributed features.

Optionally, an embodiment further provides a computer storage medium, the computer storage medium storing a computer executable instruction, and the computer executable instruction being configured to perform the audio identification method according to any one of the foregoing embodiments, specifically, at least one shown in FIG. 2, FIG. 3, and FIG. 4. The computer storage medium may be storage media of various types, for example, a RAM, a ROM, a flash memory, an optical disc, and a magnetic tape. Optionally, the computer storage medium is a non-transitory storage medium.

After considering the specification and practicing the present disclosure, a person skilled in the art would easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the art. The specification and the embodiments are considered as merely exemplary, and the real scope and spirit of the present disclosure are pointed out in the following claims.

It should be understood that the present disclosure is not limited to the precise structures described above and shown in the accompanying drawings, and various modifications and changes can be made without departing from the scope of the present disclosure. The scope of the present disclosure is limited by only the appended claims.

What is claimed is:

1. An audio identification method, the method comprising:
  obtaining an original pitch sequence of an audio sample, the original pitch sequence configured to indicate a frequency of the audio sample at a plurality of time points;
  dividing the original pitch sequence into a plurality of pitch sub-sequences by:

determining mute sequences included in the original pitch sequence, the mute sequence being a sequence whose pitch value is 0;

determining, according to lengths of the mute sequences, that a location of at least one of the mute sequences in the original pitch sequence is a determined division location by:

determining whether a number of the mute sequences is greater than m, m being an integer greater than or equal to 1; and when the number of the mute sequences is not greater than m, determining that locations of the mute sequences in the original pitch sequence are division locations; or when the number of the mute sequences is greater than m, determining that locations of k mute sequences having longest lengths in the mute sequences in the original pitch sequence are division locations, k being less than or equal to m, and k being a positive integer;

respectively identifying the original pitch sequence and the plurality of pitch sub-sequences; and combining identification results obtained by respectively identifying the original pitch sequence and the plurality of pitch sub-sequences, to obtain an identification result of the audio sample.

2. The method according to claim 1, wherein dividing the original pitch sequence into the plurality of pitch sub-sequences further comprises:

obtaining the plurality of pitch sub-sequences by dividing the original pitch sequence according to the determined division location.

3. The method according to claim 1, wherein respectively identifying the original pitch sequence and the plurality of pitch sub-sequences comprises:

respectively matching the original pitch sequence and the plurality of pitch sub-sequences with sequence samples, to obtain matching degrees respectively between the original pitch sequence and the sequence samples and between the plurality of pitch sub-sequences and the sequence samples.

4. The method according to claim 1, wherein respectively identifying the original pitch sequence and the plurality of pitch sub-sequences comprises:

matching the original pitch sequence and preset sequence samples by using a first matching algorithm, and determining n sequence samples having highest matching values with the original pitch sequence, n being an integer greater than or equal to 1; and respectively matching the original pitch sequence and the plurality of pitch sub-sequences with the n sequence samples by using a second matching algorithm.

5. The method according to claim 1, wherein respectively identifying the original pitch sequence and the plurality of pitch sub-sequences comprises:

respectively using the original pitch sequence and the pitch sub-sequences as to-be-matched sequences based on a first matching algorithm, respectively matching the to-be-matched sequences with preset sequence samples, and determining n sequence samples corresponding to the to-be-matched sequences according to matching values between the preset sequence samples and the to-be-matched sequences in descending order, n being an integer greater than or equal to 1.

6. The method according to claim 1, wherein respectively identifying the original pitch sequence and the plurality of pitch sub-sequences comprises:

obtaining N sequence samples having highest matching degrees with the original pitch sequence and the plurality of pitch sub-sequences, and matching degrees respectively between the N sequence samples and the original pitch sequence and between the N sequence samples and the plurality of pitch sub-sequences; and forming an identification result comprising the N sequence samples and the matching degrees respectively between the N sequence samples and the original pitch sequence and between the N sequence samples and the plurality of pitch sub-sequences, N being an integer greater than or equal to 1.

7. The method according to claim 1, wherein combining identification results obtained by respectively identifying the original pitch sequence and the plurality of pitch sub-sequences, to obtain an identification result of the audio sample comprises:

scoring N sequence samples according to the identification result, wherein matching degrees between the sequence sample and the original pitch sequence and between the sequence sample and the plurality of pitch sub-sequences are directly proportional to a score of the sequence sample;

sorting, according to corresponding scores, sequence samples in the identification results respectively corresponding to the original pitch sequence and the plurality of pitch sub-sequences; and obtaining the identification result of the audio sample according to a sorting result.

8. The method according to claim 7, wherein obtaining the identification result of the audio sample according to a sorting result comprises:

obtaining audios corresponding to the N sequence samples having highest total scores in the identification results respectively corresponding to the original pitch sequence and the plurality of pitch sub-sequences as the identification result of the audio sample.

9. The method according to claim 1, wherein respectively identifying the original pitch sequence and the plurality of pitch sub-sequences comprises:

matching, by using a second matching algorithm, the original pitch sequence with n sequence samples having highest matching values with the original pitch sequence that are obtained by using a first matching algorithm.

10. The method according to claim 1, wherein respectively identifying the original pitch sequence and the plurality of pitch sub-sequences comprises:

matching, by using a second matching algorithm, an $m^{th}$ pitch sub-sequence with n sequence samples having highest matching values with the $m^{th}$ pitch sub-sequence that are obtained by using a first matching algorithm, m being at least one integer of 1 to a total number of the plurality of pitch sub-sequences.

11. An audio identification apparatus, the apparatus comprising:

a processor;

a memory configured to store processor-executable instructions that, when executed by the processor, cause the processor to:

obtain an original pitch sequence of an audio sample, the original pitch sequence being used to indicate a frequency of the audio sample at each time point;

divide the original pitch sequence into a plurality of pitch sub-sequences by:

determining mute sequences included in the original pitch sequence, the mute sequence being a sequence whose pitch value is 0;

determining, according to lengths of the mute sequences, that a location of at least one of the mute sequences in the original pitch sequence is a determined division location by:

determining whether a number of the mute sequences is greater than m, m being an integer greater than or equal to 1; and
when the number of the mute sequences is not greater than m, determining that locations of the mute sequences in the original pitch sequence are division locations; or
when the number of the mute sequences is greater than m, determining that locations of k mute sequences having longest lengths in the mute sequences in the original pitch sequence are division locations, k being less than or equal to m, and k being a positive integer;
respectively identify the original pitch sequence and the plurality of pitch sub-sequences; and
combine identification results obtained by respectively identifying the original pitch sequence and the plurality of pitch sub-sequences, to obtain an identification result of the audio sample.

12. The apparatus according to claim 11, wherein the memory is configured to store processor-executable instructions that, when executed by the processor, further to cause the processor to:
divide the original pitch sequence according to the determined division location, to obtain the plurality of pitch sub-sequences.

13. The apparatus according to claim 11, wherein the memory is configured to store processor-executable instructions that, when executed by the processor, cause the processor to:
respectively match the original pitch sequence and the plurality of pitch sub-sequences with sequence samples, to obtain matching degrees respectively between the original pitch sequence and the sequence samples and between the plurality of pitch sub-sequences and the sequence samples;
obtain, based on the matching degrees, N sequence samples having highest matching degrees with the original pitch sequence and the plurality of pitch sub-sequences, and matching degrees respectively between the N sequence samples and the original pitch sequence and between the N sequence samples and the plurality of pitch sub-sequences;
form an identification result comprising the N sequence samples and the matching degrees respectively between the N sequence samples and the original pitch sequence and between the N sequence samples and the plurality of pitch sub-sequences, N being a positive integer greater than 1;
score the N sequence samples according to the identification result, the matching degrees between the sequence sample and the original pitch sequence and between the sequence sample and the plurality of pitch sub-sequences are directly proportional to a score of the sequence sample;
sort, according to corresponding scores, sequence samples in the identification results respectively corresponding to the original pitch sequence and the plurality of pitch sub-sequences; and
obtain the identification result of the audio sample according to a sorting result.

14. The apparatus according to claim 13, wherein the memory is configured to store processor-executable instructions that, when executed by the processor, cause the processor to obtain audios corresponding to the N sequence samples having highest total scores in the identification results respectively corresponding to the original pitch sequence and the plurality of pitch sub-sequences as the identification result of the audio sample.

15. The apparatus according to claim 11, wherein the memory is configured to store processor-executable instructions that, when executed by the processor, cause the processor to:
match the original pitch sequence and preset sequence samples by using a first matching algorithm, and determine n sequence samples having highest matching values with the original pitch sequence, n being an integer greater than or equal to 1; and
respectively match the original pitch sequence and the plurality of pitch sub-sequences with the n sequence samples by using a second matching algorithm.

16. The apparatus according to claim 11, wherein the memory is configured to store processor-executable instructions that, when executed by the processor, cause the processor to:
respectively use the original pitch sequence and the pitch sub-sequences as to-be-matched sequences by using a first matching algorithm, respectively match the to-be-matched sequences with preset sequence samples, and determine n sequence samples corresponding to the to-be-matched sequences according to matching values between the preset sequence samples and the to-be-matched sequences in descending order, n being an integer greater than or equal to 1;
match, by using a second matching algorithm, the original pitch sequence with the n sequence samples having the highest matching values with the original pitch sequence that are obtained by using the first matching algorithm; and
match, by using the second matching algorithm, an $m^{th}$ pitch sub-sequence with the n sequence samples having highest matching values with the $m^{th}$ pitch sub-sequence that are obtained by using the first matching algorithm, m being at least one integer of 1 to a total number of the plurality of pitch sub-sequences.

17. A non-transitory computer storage medium, the non-transitory computer storage medium storing processor executable instructions that, when executed by a processor, cause the processor to:
obtain an original pitch sequence of an audio sample, the original pitch sequence configured to indicate a frequency of the audio sample at a plurality of time points;
divide the original pitch sequence into a plurality of pitch sub-sequences by:
determining mute sequences included in the original pitch sequence, the mute sequence being a sequence whose pitch value is 0;
determining, according to lengths of the mute sequences, that a location of at least one of the mute sequences in the original pitch sequence is a determined division location by:
determining whether a number of the mute sequences is greater than m, m being an integer greater than or equal to 1; and
when the number of the mute sequences is not greater than m, determining that locations of the mute sequences in the original pitch sequence are division locations; or
when the number of the mute sequences is greater than m, determining that locations of k mute sequences having longest lengths in the mute sequences in the original pitch sequence are division locations, k being less than or equal to m, and k being a positive integer;
respectively identify the original pitch sequence and the plurality of pitch sub-sequences; and combine identification results obtained by respectively identifying the original pitch sequence and the plurality of pitch sub-sequences, to obtain an identification result of the audio sample.

18. The non-transitory computer storage medium of claim 17, wherein the processor executable instructions, when executed by the processor, cause the processor to divide the original pitch sequence into the plurality of pitch sub-sequences by:
  determining mute sequences included in the original pitch sequence, the mute sequence being a sequence whose pitch value is 0;
  determining, according to lengths of the mute sequences, that a location of at least one of the mute sequences in the original pitch sequence is a determined division location; and
  obtaining the plurality of pitch sub-sequences by dividing the original pitch sequence according to the determined division location.

19. The non-transitory computer storage medium of claim 17, wherein the processor executable instructions, when executed by the processor, cause the processor to respectively identifying the original pitch sequence and the plurality of pitch sub-sequences by:
  respectively matching the original pitch sequence and the plurality of pitch sub-sequences with sequence samples, to obtain matching degrees respectively between the original pitch sequence and the sequence samples and between the plurality of pitch sub-sequences and the sequence samples;
  obtaining, based on the matching degrees, N sequence samples having highest matching degrees with the original pitch sequence and the plurality of pitch sub-sequences, and matching degrees respectively between the N sequence samples and the original pitch sequence and between the N sequence samples and the plurality of pitch sub-sequences; and
  forming an identification result comprising the N sequence samples and the matching degrees respectively between the N sequence samples and the original pitch sequence and between the N sequence samples and the plurality of pitch sub-sequences, N being an integer greater than or equal to 1; and
  wherein combining identification results obtained by respectively identifying the original pitch sequence and the plurality of pitch sub-sequences, to obtain an identification result of the audio sample comprises:
  scoring the N sequence samples according to the identification result, the matching degrees between the sequence sample and the original pitch sequence and between the sequence sample and the plurality of pitch sub-sequences are directly proportional to a score of the sequence sample;
  sorting, according to corresponding scores, sequence samples in the identification results respectively corresponding to the original pitch sequence and the plurality of pitch sub-sequences; and
  obtaining the identification result of the audio sample according to a sorting result.

20. The non-transitory computer storage medium of claim 17, wherein the processor executable instructions, when executed by the processor, cause the processor to respectively identify the original pitch sequence and the plurality of pitch sub-sequences by:
  matching the original pitch sequence and preset sequence samples by using a first matching algorithm, and determining n sequence samples having highest matching values with the original pitch sequence, n being an integer greater than or equal to 1; and
  respectively matching the original pitch sequence and the plurality of pitch sub-sequences with the n sequence samples by using a second matching algorithm.

* * * * *